United States Patent [19]

Lancaster et al.

[11] Patent Number: 4,678,702
[45] Date of Patent: Jul. 7, 1987

[54] PROTECTIVE LAMINATE

[75] Inventors: Robert L. Lancaster, Atlanta; Raymond E. Shaw, Roswell, both of Ga.

[73] Assignee: Petro Products, Inc., Atlanta, Ga.

[21] Appl. No.: 891,455

[22] Filed: Jul. 30, 1986

[51] Int. Cl.⁴ ............................................. B32B 7/00
[52] U.S. Cl. .................................. 428/252; 428/246; 428/267; 428/269; 428/911
[58] Field of Search .............. 428/246, 252, 267, 269, 428/911

[56] References Cited

U.S. PATENT DOCUMENTS

| | | | |
|---|---|---|---|
| 1,556,245 | 11/1979 | Sacks . | |
| 3,719,545 | 3/1973 | Lawler | 161/50 |
| 3,866,242 | 2/1975 | Slagel | 2/2.5 |
| 3,891,996 | 7/1975 | Leach et al. | 2/2.5 |
| 4,008,352 | 2/1977 | Dawes et al. | 428/474 |
| 4,048,362 | 9/1977 | Moring et al. | 428/36 |
| 4,079,161 | 3/1978 | Kile | 428/220 |
| 4,181,768 | 1/1980 | Severin | 428/252 |
| 4,233,367 | 11/1980 | Tichnor et al. | 428/476.3 |
| 4,287,607 | 9/1981 | Leach | 2/2.5 |
| 4,299,677 | 9/1979 | Bottini et al. | 428/246 |
| 4,501,856 | 2/1985 | Harpell et al. | 428/911 |
| 4,510,200 | 4/1985 | Samiwich | 428/252 |
| 4,522,871 | 6/1985 | Armellino et al. | 428/252 |
| 4,574,105 | 3/1986 | Donovan | 428/911 |

*Primary Examiner*—James J. Bell
*Attorney, Agent, or Firm*—Dale Lischer; J. Rodgers Lunsford, III

[57] ABSTRACT

A rigid protective laminate is formed of at least nine layers of Kevlar fabric bonded together by internal layers of Surlyn which has been subjected to sufficient heat and pressure to cause the Surlyn to flow into and encapsulate the yarn of the Kevlar fabric. External Surlyn layers on the sides and edges protect the outermost fabric layers from moisture and provide a smooth outer surface.

14 Claims, 2 Drawing Figures

PROTECTIVE LAMINATE

BACKGROUND OF THE INVENTION

This invention relates generally to protective materials such as bulletproof materials, and more particularly concerns a rigid protective laminate which may be used as a bulletproof shield.

Lightweight protective armour is well-known in the art. For example, Severin U.S. Pat. No. 4,181,768 discloses a laminate useful for body armour comprising alternating layers of Kevlar fabric and 6, 6 nylon film to bind the Kevlar fabric layers into a rigid composite. The bonding process is carried out at temperatures and pressures so that the nylon film only minimally flows into the yarn bundles of the fabric layer. Particularly, the Severin patent discloses a laminate having twelve layers of Kevlar fabric laminated together with eleven internal layers of nylon film and having two external layers of nylon film. The laminate has a thickness varying between 0.242 and 0.265 inch. The area density of the Severin laminate varies from 1.5 to 2.3 pounds per square foot (lb./ft.$^2$). Particularly, in Example of 4 (Item i, Table I), the Severin patent teaches that poor ballistic performance results if the nylon is heated to such an extent that it impregnates the yarn in the Kevlar fabric.

The nylon laminate of Kevlar as disclosed in the Severin patent may be subject to delamination because the nylon does not impregnate the yarn of the Kevlar fabric and thus provide substantial adherence between the layers. Particularly, the presence of moisture which may enter the laminate at the edges is readily absorbed by the nylon, further promoting adhesive failure between the Kevlar layers.

SUMMARY OF THE INVENTION

It is therefore an object of the present invention to provide a rigid protective laminate which is thin, lightweight, will not be subject to delamination, and will stop most bullets fired from commonly-used hand guns.

In order to achieve the foregoing objectives, the present invention provides a laminate of alternating layers of Kevlar fabric and a film of an ionic copolymer, such as Surlyn. The composite Kevlar fabric and Surlyn film is heated in a press at sufficient temperature, pressure, and time to insure that the Surlyn film melts and completely saturates and encapsulates the fibers of the Kevlar fabric. In addition, in one embodiment of the invention, the ends of the laminate are sealed by the Surlyn film in order to preclude moisture from seeping into the edges of the laminate. The laminate of the present invention comprises at least nine layers of Kevlar fabric bonded together by intervening Surlyn film layers with a residue of Surlyn on the outside surfaces to provide an impervious surface which is smooth and aesthetically pleasing. The resulting laminate is no thicker than 0.18 inch and has an area density of less than 1.1 lb./ft.$^2$.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Figure 1:
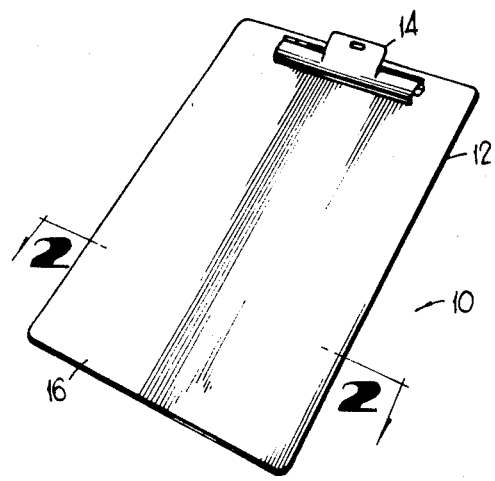
FIG. 1 is a perspective view of a clipboard constructed of the rigid protective laminate of the present invention.

Turning to FIG. 1, there is shown what appears to be an ordinary clipboard 10 having a board portion 12 with a top surface 16. A standard clip mechanism 14 is mounted on the top surface 16 of the board portion 12 of the clipboard 10.

Figure 2:
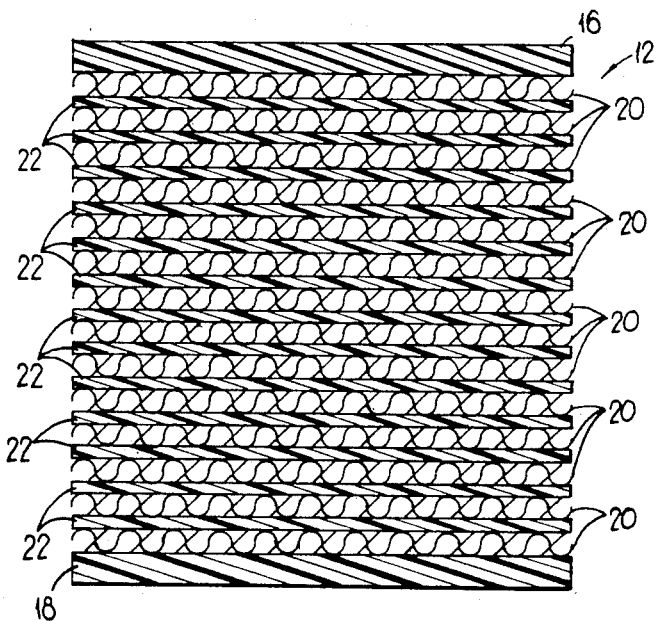
FIG. 2 is a cross-section of the rigid protective laminate of the present invention as seen along line 2—2 of FIG. 1.

While the clipboard 10 appears in FIG. 1 to be conventional, the board portion 12 is constructed of a unique rigid protective laminate shown in cross-section in FIG. 2. Because of the protective qualities of the laminate 12, the clipboard may be used as a protective instrumentality for police officers and the like. For example, when approaching an automobile, the clipboard 10 could be carried by the officer to hold the various documents required in issuing summonses. If upon approaching the car, an occupant were to assault the officer with a gun, the clipboard could be used as an emergency shield for fending off bullets fired from inside the car. It would be obvious to a person of ordinary skill in the art, however, that the unique laminate 12 of the present invention could be used to provide lightweight, rigid, protective shields for other applications such as inserts in furniture, doors, brief cases, and automobile panels.

Turning to FIG. 2, it can be seen that the protective laminate 12 of the present invention comprises fourteen layers 20 of a fabric woven from yarn of poly-(p-pheleylene terephthalamide) bonded together by intervening layers 22 of an ionic copolymer film which is the product of the reaction of an olefin and metallic salt of an unsaturated monocarboxylic acid. In addition, the laminate 12 has a top layer 16 and a bottom layer 18, both of which are formed from the same ionic copolymer as internal bonding layers 22.

The woven fabric comprising layers 20 is preferably woven from yarn sold under the trademark Kevlar by DuPont & Co., Wilmington, Del. The woven fabric of the present invention is preferably woven from Kevlar yarn of 1000 to 1500 denier in standard DuPont weave specified as S-710. The resulting fabric has a basis weight of 8.3 oz./yd.$^2$ to 9.6 oz./yd.$^2$.

The ionic copolymer comprising layers 22 is preferably an ionomer sold under the trademark Surlyn of DuPont & Co., Wilmington, Del. Each internal Surlyn layer 22 is formed by a 3-mil film of Surlyn, and the external Surlyn layers 16 and 18 are each formed by an 8-mil film of Surlyn.

The protective laminate 12 is produced by interleaving layers 20 of the Kevlar fabric with layers 22 of 3-mil Surlyn film. An 8-mil film of Surlyn is placed on top of the laminate to form a top layer 16, and an 8-mil film of Surlyn is placed on the bottom of the laminate to form a bottom layer 18. If desired, the top and bottom films may extend beyond the edge and be wrapped around the laminate structure in order to seal the edges of the laminate.

Once the stacked laminate 12 has been prepared, it is subjected to temperatures between 200° F. and 400° F. and pressures between 10 psi and 1000 psi gauge for a time between 45 seconds and 5 minutes. The temperature, pressure, and time, must be sufficient to cause the internal layers 22 of Surlyn film to melt to a point such that the Surlyn will flow into and encapsulate the yarn of the Kevlar fabric. It should be apparent to those of ordinary skill in the art that if higher temperatures are used, lower pressures and time will be sufficient to cause the Surlyn film to melt and flow into and encapsulate the yarn of the Kevlar fabric. On the other hand, if a lesser temperature is used, more pressure and time will be required to achieve the same flow and bonding.

During the heating and compressing, the external 8-mil films of Surlyn also melt and flow into the outermost layers of Kevlar fabric. Because the Kevlar fabric can absorb only a certain amount of Surlyn, there is an excess of melted Surlyn on the top and the bottom of the laminate which upon removal of heat and pressure re-forms into solid, impervious external layers 16 and 18. The external layers 16 and 18 are primarily for the purposes of sealing the laminate against intrusion of moisture and for aesthetic purposes.

In accordance with the present invention, the following samples of the protective laminate have been made and tested.

EXAMPLE 1

A laminate having nine layers of Kevlar fabric, eight internal layers of 3-mil Surlyn film, and two external layers of 8-mil Surlyn film, was produced by placing the stacked laminate between heated platens and subjecting the stacked laminate to a pressure of about 250 psi, a temperature of 400° F., and for a time of five minutes. The yarn used in making the Kevlar fabric was 1000 denier, the weave was S-713, and the basis weight of the resulting fabric was 8.3 oz./yd.$^2$. The nine-layer laminate was subjected to firing tests with the following results:

|  | Gun Caliber | Firing Distance | Results |
|---|---|---|---|
| 1. | .45 caliber | 15 yards | Bullet ricocheted, slight surface damage |
| 2. | .45 caliber | 7 yards | Same as (1) above |
| 3. | .45 caliber | 7 feet | Same as (1) above |
| 4. | .357 magnum silver-tipped bullet | 7 feet | Bullet penetrated the laminate |
| 5. | .38 caliber | 7 feet | Bullet was stopped |
| 6. | .25 caliber automatic | 2 feet | Bullet was stopped |
| 7. | .22 caliber long rifle high velocity | 2 feet | Bullet lodged between layers of the laminate |

EXAMPLE 2

A laminate having 12 layers of Kevlar fabric, 11 internal layers of 3-mil Surlyn film, and two external layers of 8-mil Surlyn film was produced by placing the stacked laminate between heated platens and subjecting the laminate to a pressure of about 250 psi, a temperature of 400° F., and for a time of five minutes. The Kevlar fabric was woven from 1500 denier yarn using an S-710 weave to produce a fabric having a 9.6 oz.-/yd.$^2$ basis weight. The resulting 12-layer laminate was subjected to firing tests with the following results:

|  | Gun Caliber | Firing Distance | Results |
|---|---|---|---|
| 1. | .45 caliber | 15 yards | Bullet ricocheted |
| 2. | .45 caliber | 7 yards | Bullet ricocheted |
| 3. | .45 caliber | 7 feet | Bullet ricocheted |
| 4. | .357 magnum silver-tipped bullet | 7 feet | Bullet lodged in the laminate |
| 5. | .38 caliber | 7 feet | Laminate stopped the bullet |
| 6. | .25 caliber automatic | 2 feet | Laminate stopped the bullet |
| 7. | .22 caliber long rifle high velocity | 2 feet | Laminate stopped the bullet |

EXAMPLE 3

A laminate was prepared having 14 layers of Kevlar fabric, 13 internal layers of 3-mil Surlyn film, and two external layers of 8-mil Surlyn film. The Kevlar fabric was woven from 1000 denier yarn using an S-713 weave which produced a fabric having an 8.3 oz./yd.$^2$ basis weight. The laminate was constructed by placing the stacked laminate between two heated platens and subjecting the material to a pressure of about 250 psi, at a temperature of 400° F., and for a time of five minutes. The resulting laminate was subjected to firing tests with the following results:

|  | Gun Caliber | Firing Distance | Results |
|---|---|---|---|
| 1. | .45 caliber | 15 yards | Laminate stopped the bullet |
| 2. | .45 caliber | 7 yards | Laminate stopped the bullet |
| 3. | .45 caliber | 7 feet | Laminate stopped the bullet |
| 4. | .357 magnum silver-tipped bullet | 7 feet | Bullet lodged in the laminate |
| 5. | .38 caliber | 7 feet | Bullet stopped by the laminate |
| 6. | .25 caliber automatic | 2 feet | Bullet stuck in the first layer of the laminate |
| 7. | .22 caliber long rifle high velocity | 2 feet | Bullet lodged in the laminate |

We claim:
1. A laminate comprising layers of a fabric woven from yarn of poly-(p-phenylene terephthalamide) bonded together by intervening layers of an ionic copolymer which is the product of the reaction of an olefin and metallic salt of an unsaturated monocarboxylic acid.
2. The laminate of claim 1, wherein the ionic copolymer has saturated the fabric yarn.
3. The laminate of claim 1, wherein the fabric is woven from yarn of 1000–1500 denier and there are at least nine layers of fabric.
4. The laminate of claim 3, wherein the laminate has a layer of the ionic copolymer on either side of the laminate.
5. The laminate of claim 4, wherein the laminate has edges which edges are enclosed by a layer of the ionic copolymer.

6. The laminate of claim 1 or 3, wherein the laminate is less than 0.18 inch thick.

7. The laminate of claim 1 or 3, wherein the laminate has an area density of less than 1.1 lb./ft.$^2$.

8. A laminate formed by stacking layers of a fabric woven from yarn of poly-(p-phenylene terephthalamide) with intervening layers of an ionic copolymer film which is the product of the reaction of an olefin and metallic salt of an unsaturated monocarboxylic acid and subjecting the laminate to heat and pressure for a time sufficient to cause the ionic copolymer film to flow into and encapsulate the yarn of the fabric.

9. The laminate of claim 8, wherein the heat is between 200° F. and 450° F., the pressure is between 10 psi and 1000 psi gauge, and the time is between 45 seconds and 5 minutes.

10. The laminate of claim 8, wherein the yarn is 1000–1500 denier and there are at least nine layers of fabric.

11. The laminate of claim 8, wherein the laminate has a layer of the ionic copolymer on either side of the laminate.

12. The laminate of claim 11, wherein the laminate has edges which edges are enclosed by a layer of ionic copolymer.

13. The laminate of claim 8 or 10, wherein the laminate is less than 0.18 inch thick.

14. The laminate of claim 8 or 10, wherein the laminate has an area density of less than 1.1 lb./ft.$^2$.

* * * * *